UNITED STATES PATENT OFFICE.

ALBERT N. ERICKSON, OF ELMHURST, NEW YORK, ASSIGNOR TO UNION CARBIDE & CARBON RESEARCH LABORATORIES, INC., A CORPORATION OF NEW YORK.

PROCESS OF REMOVING PHOSPHORUS FROM VANADIUM SOLUTIONS.

1,421,191.  Specification of Letters Patent.  Patented June 27, 1922.

No Drawing.  Application filed October 5, 1921. Serial No. 505,621.

*To all whom it may concern:*

Be it known that I, ALBERT N. ERICKSON, a citizen of the United States, residing at Elmhurst, in the county of Queens and State of New York, have invented certain new and useful Improvements in Processes of Removing Phosphorus from Vanadium Solutions, of which the following is a specification.

This invention is a process of removing phosphorus from vanadium solutions.

In the extraction of vanadium ores, the vanadium is ordinarily obtained in an acid solution containing impurities, for example zinc, lead, iron, arsenic and phosphorus. In working such a solution for its vanadium content, it is usually necessary completely to separate the phosphorus from the vanadium, as a contamination of the vanadium with phosphorus would render it unfit for most metallurgical uses.

I have discovered that the phosphorus can be almost quantitatively precipitated from such solutions without serious loss of vanadium if the acidity of hydrogen ion concentration is properly adjusted, and if a suitable metal is present in proper quantity to permit of the formation of an insoluble phosphate by the phosphorus present.

A proper hydrogen ion concentration is about that of very dilute acetic acid, though this may be somewhat varied according to circumstances. For a particular solution the approximate limits of hydrogen ion concentration can be quickly ascertained by trial.

Solutions of the kind referred to are usually quite strongly acid with mineral acids, and I prefer to neutralize most of the free acid as a preliminary step. Any neutralizing agent which does not introduce contaminating substances may be employed; the hydroxides and carbonates of the metals, whether soluble or insoluble, being suitable in general. For the sake of control of the neutralizing operation, I prefer to use a carbonate, and a cheap material such as calcium carbonate commends itself. Limestone ground to pass a 100-mesh screen has given excellent results and is my preferred neutralizing agent.

At the end of the preliminary neutralization, the solution should be slightly but distinctly acid. This result may be conveniently attained by adding the ground limestone with due precautions to avoid an excess until a slight further addition produces no visible effervescence. With most neutralizing agents, an excess is apt to cause a vanadium precipitate to form in the solution, and this is undesirable.

During the neutralization the vanadium must remain in the pentavalent state, as otherwise a precipitation of vanadium occurs. In case some of the vanadium becomes reduced—indicated by a change in the color of the solution from red to brownish or greenish—it must be reoxidized to the pentavalent state by the addition of a suitable oxidizer, such as a chlorate or hypochlorite, or a precipitation of vanadium occurs.

For the formation of the insoluble phosphate a suitable metal must be present in proper amount. The trivalent metals, such as ferric iron and aluminum, are suitable, and iron is preferred. If not already present in solution in sufficient amount, a compound of iron or other metal should be added after the excess acid is neutralized. Only enough iron to combine with the phosphorus should be present, as an excess is apt to result in the precipitation of an iron-vanadium compound.

The final reduction in the hydrogen ion concentration is conveniently effected by the addition to the solution of the negative ion of acetic acid. As this acid is weakly dissociated, a high concentration of hydrogen ion cannot exist in the presence of any considerable concentration of the negative ion of the acid, in accordance with the electrolytic dissociation theory. The negative ion may be added as an acetate, for example sodium or calcium acetate. If there is any reason to believe that the concentration of hydrogen ion is already too low, acetic acid should be substituted for the acetate and an acidity equal to that of very dilute acetic acid will thus be produced.

When the acidity is reduced to the desired value, a phosphate precipitate will often form but precipitation of the phosphorus is usually incomplete. It is then necessary to heat the solution, which is at room temperature during the preceding steps, to 60—100° C. depending on concentration and other conditions, until precipitation of the phosphorus is complete. The precipitate is filtered off and the vanadium recovered from the purified solution in any usual or suitable way.

If the original solution contains only a small percentage of phosphorus, the introduction of an additional base into the solution to combine with and precipitate the phosphorus need not be resorted to, as substantially complete precipitation of the phosphorus as vanadium phosphate can be obtained in solutions of proper acidity. In this case, the process is carried through exactly as described above, but no iron or the like is added. The phosphorus being present in slight amount, no serious loss of vanadium will result from this procedure.

I claim:—

1. Process of removing phosphorus from vanadium solutions which comprises adjusting the hydrogen ion concentration to about that of very dilute acetic acid, and then precipitating phosphorus as a phosphate.

2. Process according to claim 1 in which the precipitated phosphate contains a trivalent metal.

3. Process according to claim 1 in which the precipitated phosphate is ferric phosphate.

4. Process according to claim 1 in which the precipitation is completed at a temperature not substantially below 60° C.

5. Process of removing phosphorus from vanadium solutions which comprises adding to the solution the negative ion of acetic acid to diminish the concentration of hydrogen ion, and then precipitating the phosphorus as a phosphate.

6. Process of removing phosphorus from vanadium solutions containing free mineral acid, which comprises adding a carbonate to the solution so long as successive additions cause effervescence, then adding to the solution an acetate in quantity in excess of that equivalent to the residual free acid and then precipitating the phosphorus as a phosphate.

7. Process according to claim 6 in which the carbonate employed is powdered calcium carbonate.

In testimony whereof, I affix my signature.

ALBERT N. ERICKSON.